United States Patent Office 3,061,598
Patented Oct. 30, 1962

3,061,598
METHOD OF POLYMERIZING METHACRYLATE ESTER MONOMER IN THE PRESENCE OF A POLYMER AND A CYCLOHEXLY AMINE
John A. Cornell, Berwyn, Pa., assignor to Sartomer Resins, Inc., Philadelphia, Pa., a corporation of Delaware
No Drawing. Filed Mar. 2, 1959, Ser. No. 796,237
6 Claims. (Cl. 260—89.5)

This invention relates to new heat-sensitive inhibitors of the formula

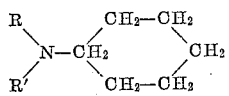

where R and R' are each a member selected from the group consisting of alkyl radicals, mono-halogen alkyl radicals, hydroxy alkyl radicals and alkoxy alkyl radicals for stabilizing polymerizable methacrylate ester monomers and compositions containing these monomers at elevated polymerizing temperatures to prevent polymerization of these monomers and compositions containing these monomers at temperatures of less than about 70–90° C. and which inhibitors are inactivated at polymerizing temperatures above about 100–110° C. to regulate elevated temperature polymerization of the polymerizable methacrylate ester monomers and to thereby provide superior polymerized solid products having enhanced hardness, enhanced heat resistance with substantially no color imparted to the product by the tertiary cyclohexylamine acting in its dual capacity as inhibitor and regulator for the polymerizable methacrylate esters.

Inhibitors, such as certain quinones, are substances which when added to a monomer suppress the formation of polymer until almost all the inhibitor has been consumed, after which the reaction rate rapidly assumes its normal value; the length of the resulting induction period is proportional to the amount of inhibitor added. A retarder (for example, an aromatic nitrocompound) on the other hand merely reduces the rate of polymerization; the reaction rate rises progressively as the retarder is consumed and finally assumes its normal value. The equivalent induction period of the retarder, that is, the time which would have been required for all the retarder to react if it had completely suppressed the reaction, is usually obtained by extrapolating the final steady rate to the time axis.

According to the generally accepted explanation of inhibitor and retarder action inhibitors react with initial radicals to give products incapable of inducing further polymerization; retarders are less reactive than inhibitors and therefore do not entirely suppress the propagation reaction. Accordingly, a retarder used in high concentrations may simulate the behavior of an inhibitor.

The heat-sensitive inhibitors of the present invention do not appear to have any conventional retarding action since the polymerized products produced are of high molecular weight. In the case of polyfunctional methacrylate esters such as ethylene glycol dimethacrylate which is normally inhibited with 60 p.p.m. hydroquinone it has been found that ethylene glycol dimethacrylate does not polymerize due to air inhibition when sprayed out in thin films (1.5 mils) in lacquer formations. A regulating action for high molecular weight is obtained.

In contrast, if no inhibitor is used as compared with hydroquinone, an improvement is found in the surface hardness. Table I below shows the effect of addition of 10% uninhibited ethylene glycol dimethacrylate to an acrylic lacquer formation. Lacquer formation showed an original Sward Rocker Hardness of 30 when baked at 310° F. for 30 minutes. Table I shows the effect of time and temperature variations on Sward hardness of this lacquer with the addition of 10% uninhibited ethylene glycol dimethacrylate.

TABLE I

| Time, Minutes | Temperature, °F. | | | | | |
|---|---|---|---|---|---|---|
| | 150 | 200 | 250 | 300 | 350 | 400 |
| 5 | 16 | 10 | 24 | 24 | 26 | 26 |
| 10 | 16 | 18 | 24 | 26 | 30 | 42 |
| 20 | 20 | 18 | 24 | 28 | 45 | 48 |
| 30 | 20 | 20 | 24 | 28 | 50 | 42 |

Since it is not practical to use ethylene glycol dimethacrylate in uninhibited form various inhibitors and retarders were studied in the hope that one could be found that would either be inactivated or volatilized at elevated temperatures, thus permitting the ethylene glycol dimethacrylate to polymerize in the film. Only two of the inhibitors screened showed promising results—dimethyl cyclohexylamine and tetrahydroquinoline. Table II below shows the time required to polymerize ethylene glycol dimethacrylate in an oven at 320° F.:

TABLE II

| Monomer | Ethylene Glycol Dimethacrylate | | | |
|---|---|---|---|---|
| | No. Inh. | 60 p.p.m. HQ | 500 p.p.m. dimethyl cyclohexylamine | 500 p.p.m. tetrahydroquinoline |
| Minutes required to complete polymerization. | 9 min. | Polymerization had not taken place in one hour. Monomer had almost completely evaporated before polymerization occurred. | 9 min. | 16 mins. (Polymer has decided yellow color). |

The polymerizable methacrylate ester monomers heretofore initiated for polymerization at temperatures above about 80° C. in the presence of a free radical polymerization catalyst have been stabilized with quinones. These monomers include volatile monofunctional liquid monomers such as methyl methacrylate, ethyl methacrylate, etc., having boiling points about 100° C. or slightly higher and non-volatile polyfunctional liquid monomers such as ethylene dimethacrylate, polyethylene glycol dimethacrylate, methacrylic anhydride, methylene bis-acrylamide, etc., having much higher boiling points. The polymerization which is inhibited by hydroquinone and initiated by peroxide for volatile monofunctional methacrylate ester monomer in bulk or in solvent solution is carried out at elevated temperatures close to the boiling point of the monomer, for example, at about 90° C. in the case of methyl methacrylate monomer per se or in casting syrup containing about 30–70% of methyl methacrylate monomer and polymeric methyl methacrylate. In the presence of hydroquinone, the curing at 80° C. does not permit the attainment of the desired surface hardness and objectionable color develops. Even if polymerization is carried out in an autoclave at pressures above atmospheric pressure and up to about 100 pounds per square inch in order to prevent bubble formation in thick sections of solid polymer, the desired surface hardness is not attained and color develops.

By placing thermocouples within castings to follow the course of polymerization by heat evolution, it is particularly noted for hydroquinone stabilized methyl methacrylate monomer composition that the temperature vs. time curve defines three distinct portions, a first flat portion or plateau characterized by a relatively flat slope termed the induction period, which in a typical case is up 50% of the total time for development of peak exotherm, a subsequent relatively steep portion of the curve during which the temperature rises to the peak exertherm termed the initiation curve and a terminal drop off portion of the curve indicating dissipation of heat after the peak temperature has been raised.

By appropriate selection of organic peroxide catalyst and the concentration of catalyst in polymerization of methyl methacrylate castings or by addition of prepolymerized methyl methacrylate a more gentle reaction can be realized with alternation of the exotherm curve to lower the peak temperature, flatten out the curve between induction and initiation and thereby minimize the formation of bubbles in the casting and inferior physical properties which are due to too rapid polymerization in the central part of the casting where effective heat dissipation is substantially impossible due to the low heat transfer characteristics of monomer and polymer and where temperature causes vaporization of volatile monomer ahead of the polymerization transformation. For typical curves which can be attained under optimum conditions using hydroquinone or other stabilizers see page 77 of the text "Vinyl and Related Polymers," Calvin Schildknecht, John Wiley & Sons (1952).

This objectionable bubble formation is wholly obviated by using in lieu of hydroquinone or other quinones the dialkyl cyclohexylamine as inhibitor-regulators in accordance with the invention.

Aromatic tertiary amines when present in solution in methacrylate ester monomers are usually not considered as anticatalyst or inhibitors. Together with organic peroxide catalyst (lauroyl peroxide or benzoyl peroxide), these amines promote initiation of bulk or solution polymerization at lower temperatures or at room temperature. These tertiary aromatic amines yield objectionable color and are not suitable for preparation of colorless transparent polymerized solid products of optical clarity or of pigmented products without objectionable yellowing due to the formation of color bodies from the amine ultraviolet exposure. The heat-triggered tertiary cyclohexylamine of the invention is distinctively different from the amines used heretofore in (1) showing no promoting action for organic peroxide catalyst permitting initiation in bulk at temperatures below about 85° C. or at room temperature, (2) acting as an inhibitor at temperatures up to about 100° C., (3) regulating for catalysis at temperatures above about 90° C. to provide superior non-porous solid polymerized products with substantially no color imparted by the amine employed and (4) providing efficient conversion to solid polymer which is unique in the absence of color.

In comparison with other cycloaliphatic amines such as 1,2,3,4-tetrahydroquinoline utilized in concentrations of between about 0.1–0.8% with 1% benzoyl peroxide for room temperature cure of polyester casting syrups (see United States Patent to Lee No. 2,647,878), the initiator of the present invention is entirely inactive at room temperature, entirely inactive at 60–90° C. and acts as a regulator at about 90–110° C. only in a polyester composition containing at least about 35% of monomeric methacrylate ester such as methyl methacrylate or mixtures of methyl methacrylate with a cross-linking polyfunctional monomer, e.g., polyalkylene glycol dimethacrylate. Products are obtained by the invention which meet the requirements for optical clarity whereas the aforementioned tetrahydroquinoline initiator yields objectionable color forming bodies to yellow the polymer.

An object of the invention is to provide a new series of polymerization inhibitor-regulators adapted to stabilize methacrylate ester monomers at temperatures below about 90° C. and adapted to regulate polymerization at temperatures above about 100–110° C. to provide superior substantially color-free products of high clarity and pigmented products free from yellowing.

Another object of the invention is to provide a process for polymerizing at higher temperatures methacrylate ester monomers inhibited against premature gelling at temperatures below about 90–100° C. without the need for adding peroxide catalyst.

Still a further object of the invention is to provide new stabilized volatile methacrylate ester compositions and non-volatile polymerizable polyfunctional methacrylate ester cross-linking compositions containing from about 250 to about 2000 parts per million by weight of said ester which compositions are uniquely adapted as heat stabilized hardening agents polymerized thermally in situ for improving hardness, mar resistance and eliminating objectionable color when added to coating compositions, laminating compositions, polyvinyl chloride pastes, casting compositions and casting syrups.

These objects and many more advantages will be apparent in the following discussion and examples.

The following will serve as examples to illustrate the dual inhibiting and regulating effect of the tertiary cyclohexylamine stabilizer-initiators of the invention, the manner in which these amines of the invention are incorporated into polymerizable methacrylate ester monomers and the advantages of the new polymerizable compositions stabilized in accordance with the invention, the illustrative embodiment of stabilizer-initiator selected being N,N-dimethyl cyclohexylamine, but it being understood that the amines such as N,N-diethyl cyclohexylamine, N,N-diethanol cyclohexylamine, N,N-di-2-chloroethyl cyclohexylamine, etc., as fall under the foregoing formula designation are also suitable and that the examples are set forth merely for illustrative purposes. The similar tertiary cyclohexylamines as defined by the generic formula herein are to be considered as falling within the confines of the present invention.

*Preferred Non-Volatile Polyfunctional Polymerizable Methacrylate Ester Cross-Linking and Hardening Agents for Laminating, Casting, Coating and PVC Pastes*

Preferred polyfunctional monomers include methylene dimethacrylate, ethylene glycol dimethacrylate, diethylene glycol dimethacrylate, triethylene glycol dimethacrylate, propane triol tri-acrylate, pentaerythritol tetra-acrylate, methylene bis-acrylamide, methylene bis-methacrylamide, tri-ethylene glycol dimethacrylate, tetraethylene glycol dimethacrylate, higher polyethylene glycol dimethacrylate, methacrylic anhydride, pentaerythritol tetramethacrylate and resorcinol dimethacrylate. An amount of from 200–2000 parts per million of N,N-dimethyl cyclohexylamine is added to the monomers used as cross-linking agents in accordance with the invention. These compositions are storage stable for long periods of time (about 2 to 6 months) at elevated temperature (60° C.).

The foregoing compositions are useful in commerce and are widely sold as liquid polymerizable hardening agents which are inhibited with hydroquinone and its ether derivatives in amounts of about 50–100 parts per million. The substitution of the present inhibitor of the invention in an amount of 200–2000 parts per million provides superior stabilization temperatures below 80° C. without the formation of objectionable color bodies during storage and use and inhibition at high temperatures during use.

Polymerization of the volatile methyl methacrylate monomer can also be readily carried out in thin films, e.g., about 1–2 mils thick on a heat conducting metal base, can be carried out at atmospheric pressure in cases where the methyl methacrylate monomer content of the coating composition is less than about 15% and the monomer is present together with a compatible resin which is highly solvated by the monomer such as methyl methacrylate polymer, a soluble alkyd resin, a soluble polyester resin, nitrocellulose, p-toluene sulfonamide resin, soluble polyvinyl acetate, chlorinated rubber, etc. Initiation of the polyfunctional methacrylate ester monomers at elevated temperatures is carried out simply at ambient atmospheric pressure and autoclave procedures are not necessary.

*Use of Methacrylic Anhydride Hardening Agent in Methyl Methacrylate Syrups and Coatings*

Although as little as about 0.5% of methacrylic anhydride can render methyl methacrylate polymer insoluble, it is desired to use larger amounts in compositions formulated for maximum hardness and scratch resistance without undue brittleness. In the case of methyl methacrylate casting syrups hardened with methacrylic anhydride amounts of about 7–10% of the anhydride based on the total weight of methyl methacrylate polymer are preferred. The tertiary cyclohexylamine, e.g., dimethyl cyclohexylamine is effective as a stabilizer and regulator at elavated temperatures in an amount of from 250 parts to about 2000 parts per million parts of difunctional methacrylate ester.

We shall now illustrate by way of example several methods of conducting our process, but with the understanding that our invention shall not be restricted to the details therein given except as it may be limited by the claims appended hereto.

EXAMPLE I.—HARDENING OF POLYVINYL CHLORIDE PASTES

In the case where polyvinyl chloride pastes are employed with glycol and polyalkylene glycol dimethacrylate ester hardening agents, an amount of from about 4 parts of glycol dimethacrylate ester hardening agent per 100 parts of polyvinyl chloride in the liquid paste is sufficient to provide desirable hardening of the paste on curing to enhance hardening at the recommended fusion temperature of 300–400° F. for 10–40 minutes for the polyvinyl chloride paste. Preferred concentrations of the glycol dimethacrylate ester cross-linking agent based upon considerations of economy (the polyfunctional methacrylate being high in cost) and optimum hardness with minimum color lie between about 8 parts to about 22 parts of glycol dimethacrylate per 100 parts of polyvinyl chloride in the plastisol. If larger amounts of cross-linker are employed there is substantially no additional benefit of reduced time of hardening, improved hardness, etc. The tertiary cyclohexylamine added to inhibit the gelling of the plastisol containing dimethacrylate hardening agent is between about 150 to about 1500 parts per million parts of liquid dimethacrylate ester hardening agent. The preferred stabilizer because of availability is dimethylcyclohexyl amine. This stabilizer in the conventional polyvinyl chloride plastisol containing vinyl chloride resin and liquid ester plasticizer in a 40/60 to 60/40 weight ratio (see Burt U.S. Patent No. 2,618,621) and glycol dimethacrylate hardening agent exhibits low volatility at temperatures below 60° C. whereby it is effective for long periods of time, e.g., 3–6 days, to prevent premature gelling of the paste at storage temperatures below the fusion temperature of the plastisol and whereby it will be effective to efficiently cure the cross-linking polymerization of the dimethacrylate hardening agent with minimum inhibition.

EXAMPLE II.—PLASTISOL FOR USE AS A REVERSE ROLL COATING

| | |
|---|---|
| Geon 121 (polyvinyl chloride) | 100 |
| Octyl diphenyl phosphate | 30 |
| Dioctyl sebacate | 12 |
| Titanium dioxide | 10 |
| Antimony trioxide | 5 |
| Barium-cadmium stabilizer [1] | 1 |
| Polymeric methyl 9–10 epoxy stearate stabilizer | 6 |
| TEDMA (triethylene glycol dimethacrylate) | 10 |
| N,N-dimethyl cyclohexylamine (500 parts per million of TEDMA). | |
| | 174 |

[1] 50/50 mixture of barium ricinoleate and cadmium 2-ethyl hexoate.

EXAMPLE III.—PLASTISOL FOR USE AS SLUSH MOLDING COMPOSITION

| | |
|---|---|
| Geon 121 (polyvinyl chloride) | 50 |
| Geon 202 | 50 |
| Di-2-ethyl hexyl phthalate | 50 |
| TEDMA (triethylene glycol dimethacrylate | 2.3 |
| Advastab T671 [1] | 2.3 |
| N,N-dimethyl cyclohexylamine (500 parts per million of TEDMA). | |
| | 162.3 |

[1] Advance Solvents & Chemical Corp., dibutyl tin laurate.

EXAMPLE IV.—PLASTISOL FOR USE AS FLEXIBLE ROTATIONAL MOLDING COMPOSITION

| | |
|---|---|
| Geon 121 (polyvinyl chloride) | 100 |
| Di-2-ethyl hexyl phthalate | 30 |
| Dioctyl adipate | 20 |
| TEDMA (triethylene glycol dimethacrylate) | 10 |
| Zince oxide filler (low oil adsorption) | 10 |
| Barium-cadmium stabilizer liquid [1] | 2 |
| Dibutyl tin laurate | 1 |
| N,N-dimethyl cyclohexylamine (500 parts per million to TEDMA). | |
| | 173 |

[1] 50/50 mixture of barium ricinoleate and cadmium 2-ethyl hexoate in 50% concentration in inert solvent.

EXAMPLE V.—HARDENING OF ACRYLIC HEAT-CURABLE COATINGS

In an example of inhibiting gelation of a heat-curable acrylic priming or finishing coating containing copolymerizable methacrylate ester such as methyl methacrylate polymerized to a consistency of a casting syrup or polymeric solid methyl methacrylate, compatible alkyd resin such as toluene soluble coconut oil, modified glyceryl phthalate resin, or aromatic solvent-soluble diethylene glycol maleate resin syrups, hardening components such as cellulose nitrate and a cross-linking polyfunctional methacrylate ester cross-linking agent, e.g., methacrylic acid diester of aliphatic dihydric alcohols of average molecular weight 100–300 and having the formula $HO(CH_2-CH_2-O)_nH$ where $n$ is an integer of from 1 to 20, the composition containing from about 35–60% by weight of the polymerizable cross-linking agent based on the weight of the non-volatile content of the film forming modifiers there is added about 100 to about 900 parts per million parts of the preferred tertiary cyclohexylamine stabilizer in order to provide enhanced hardness of the coating which is cured by drying the composition in a ketone, ester and alcohol solvent at temperatures of 225–275° F. for a period of 10 to 45 minutes. These coating compositions are especially useful as wood and metal finishes characterized by unusual clarity, high degree of scratch resistance and mar resistance, resistance to organic solvents and good toughness. The high gloss and excellent clarity are enhanced by rubbing or sanding the coatings which may be applied as single coating or multiple coatings with sanding between coatings. See Buck U.S. Patent No. 2,772,986 for an example of this type of finish applied to wood and useful over oil-type pigmented paste wood filler to provide a finished lacquer after sanding having a surface smoothness comparable to that of plate glass.

EXAMPLE VI.—DEMONSTRATION OF HIGH TEMPERATURE NON-INHIBITING ACTION OF N,N-DIMETHYL CYCLOHEXYLAMINE

In another example of a stabilized heat-curing coating composition in accordance with the invention which is illustrated in greater detail hereinbelow, there are added to polymethyl methacrylate solid polymers of viscosity molecular weight 85,000 dissolved at 40% solids in methyl ethyl ketone a titanium dioxide paste, an amount of 10% of ethylene glycol dimethacrylate hardening agent and 500 parts by weight per million of said dimethacrylate of N,N-dimethyl cyclohexylamine together with titanium dioxide pigment paste dispersed in 30% of dioctyl phthalate to give a ratio of pigment to methyl methacrylate polymer binder of 5 to 8. This enamel composition diluted with toluene butyl acetate-ethyl acetate thinner (50:25:25) to a number of 4 Ford cup viscosity of 41 seconds at 25° C., and was applied to bonderized steel panel by spraying, air drying for one-half hour and baking at 300° F. for 30 minutes.

A first control batch of the same enamel composition as set forth in the previous paragraph was made up employing the same proportions of polymethyl methacrylate polymer of viscosity molecular weight 85,000 (40% solids in methyl ethyl ketone), the same amount of the same titanium dioxide pigment in 30% dioctyl phthalate and the same amount of the same thinner but the triethylene glycol dimethacrylate and N,N-dimethyl cyclohexylamine were omitted.

A comparison batch of the same enamel was also made up employing the same proportions of polymethyl methacrylate polymer of viscosity molecular weight 85,000 (40% solids in methyl ethyl ketone), the same amount of the same titanium dioxide pigment in 30% diotcyl phthalate and the same amount of thinner and triethylene glycol dimethacrylate were also added as in the first batch except that instead of using 500 parts per million of N,N-dimethyl cyclohexylamine as stabilizer 60 parts per million of hydroquinone was used as a stabilizer.

A second control batch of the same enamel composition was formulated in which pure triethylene glycol dimethacrylate hardner was added in the same 10% proportion but in which stabilizer was omitted. This second control batch accordingly employed the same proportions of the same polymethyl methacrylate resin in 40% solution in methyl ethyl ketone, the same titanium dioxide pigment paste in 30% dioctyl phthalate and proportions and the same thinner and proportions.

A third control batch of the same enamel composition was formulated which was identical to Batch #1 (item 3 in Table III below) except that 1% benzoyl peroxide (based on weight of monomer) was used instead of the tertiary cyclohexylamine.

Bonderized steel panels coated to a build of 2 mils dry film thickness for the first batch, the first and second control batches and the hydroquinone stabilized batch were subjected to Sward hardness test and mandrel bend test with the following results. All panels showed high gloss except when not completely cured.

TABLE III

| Composition | Sward Hardness | Mandrel Bend, inches | Exposure to Ultra-violet light color rating |
|---|---|---|---|
| 1. Control #1—no cross-linking additive | 22 | 3/8 | 2 |
| 2. Control #2—containing 10% of triethylene glycol dimethacrylate | 24 | 3/8 | 2 |
| 3. Batch #1—containing 10% of triethylene glycol dimethacrylate and 500 p.p.m. N,N-dimethyl cyclohexylamine | 22 | 1/8 | 2 |
| 4. Batch #3—containing 10% of triethylene glycol dimethacrylate and 60 p.p.m. of hydroquinone | 17 | 1/8 | 3 |
| 5. Batch #2—containing 10% of triethylene glycol dimethacrylate and 500 p.p.m. 1,2,3,4-tetrahydroquinoline | 20 | 1/8 | 8 |
| 6. Control #3—containing 10% of triethylene glycol dimethacrylate and 60 p.p.m. of hydroquinone and 1% benzoyl peroxide based on the dimethacrylate | 23 | 3/8 | 3 |

The Sward hardness of 22 observed for the first control batch employing no cross-linking additive in contrast to the Sward hardness of 17 observed when inhibited triethylene glycol dimethacrylate cross-linking additive was added indicates the ineffectiveness of the liquid cross-linking agent as a hardener for the film in the absence of any catalyst or accelerator for the cross-linking polymerization of the polyfunctional methacrylate ester.

Conventionally organic peroxides such as benzoyl peroxide are employed to accelerate hardening of the cross-linking agent and in many instances where lower temperatures for hardening are desired metal salt promoters are employed such as cobalt hexoate, cobalt naphthenate, manganese naphthenate, or tertiary aromatic amines such as dimethyl aniline are added in small amounts to the benzoyl peroxide catalyst to provide more efficient hardening. These promoters are colored per se or develop color during and after polymerization and/or upon exposure of the polymerized product to sunlight or ultraviolet light. For this reason where the achievement of substantially no color is the requirement, it has not been possible to employ the peroxide accelerator in combination with these promoters in fulfilling this requirement. Thus, peroxide catalyst alone is usually employed at higher temperatures under very carefully controlled conditions to minimize color development. The amines or cobalt salts per se have no catalytic action and develop color during polymerization (see page 206 in Schildknecht, "Vinyl and Related Polymers," John Wiley & Son (1952)) indicating inherent discoloration by use of tertiary aromatic amine promoters for peroxide bulk polymerization of methyl methacrylate and also see pages 197–203, 207 and 214–220 for description of the tedious procedures for preparing products by optical clarity.

In view of the foregoing known characteristics of tertiary aromatic amines as color body producing promoters for polymerization, it was surprising to discover that the tertiary cyclohexylamines of the present invention provide substantially no color forming in the absence of organic peroxide catalyst during polymerization and that these tertiary cyclohexylamines do not inhibit polymerization of polymerizable methacrylate ester compounds at temperatures above about 90–110° C. whereas at temperatures below about 60° C. the tertiary cyclohexylamines act as effective inhibitors retarding unwanted polymerization on gelation for extended periods of time.

As illustrated in Table III hereinabove, the conventional hydroquinone inhibitor at optimum concentration to forestall development of unacceptable color in the polymerized product provides a film which has a color rating of 3 after 16 hours exposure to ultraviolet light while the color rating of the polymerized product whose polymerization is accelerated by the method of the invention is a value of 2—which lies within the range for low color ratings exhibited in optical methyl methacrylate polymer castings.

Equally significant as evidence of a unique mechanism of regulation of polymerization by the tertiary cyclohexylamine regulators of the present invention for polymerizable methacrylate ester monomers is the Sward hardness of 23 exhibited by batch #1 containing the polymerizable methacrylate monomer and accelerator of the invention as compared with a Sward hardness value of 17 for the hydroquinone stabilized monomer in batch #3. The hardening effectiveness determined by Sward hardness of the hydroquinone stabilized monomer (batch #3) is poor and substantially less than when no stabilizer is added (see control #2).

Control #1 without added monomer for hardening has a higher Sward hardness indicating that in the absence of effective accelerator such as benzoyl peroxide an overall softening of the film results. Batch #1 in accordance with the invention provides an increase in hardness of about 35% substantiating the non-inhibiting action of the tertiary cyclohexylamine as a regulator for hardening. In contrast, the substitution of 1% benzoyl peroxide catalyst in conjunction with 60 p.p.m. of hydroquinone for the tertiary cyclohexylamine promoter in control batch #3 shows substantially the same degree of hardening—a Sward hardness of 23. Differentiating from the hardening action of benzoyl peroxide over the inhibitor, hydroquinone, in control #3 is the thermal triggering of the cyclohexylamine catalyst of the invention at a temperature above about 110° C. and effective stabilization at a temperature below about 110° C. Benzoyl peroxide, in contrast, works at a low rate as soon as it is added, and is extremely active at temperatures above about 80° C.

The color rating after exposure to ultraviolet of Table III shows the production of substantially no color bodies by the heat curing operation carried out with the film from the batch containing the N,N-dimethyl cyclohexylamine promoter of the invention in contrast to unsatisfactory color from hydroquinone stabilized monomer. These color ratings in Table III relate to standard A.P.H.A. color ratings as follows:

TABLE IV

| Stabilizer from Table III: | A.P.H.A. color rating |
|---|---|
| Hydroquinone | 150–300 |
| N,N-dimethyl cyclohexylamine | 60–80 |
| Control No. 2 (no stabilizer) | 20–40 |

The following example evaluates the polymerization efficiency of N,N-dimethyl cyclohexylamine utilizing as the polymeric component of the paint batch, a copolymer containing 92% of methyl methacrylate, 4% of ethyl methacrylate and 4% of methacrylic acid, the copolymer having a viscosity molecular weight of 60,000. The paint laboratory formulation is coated below as paint lab. batch #54.

(1) Paint lab. batch #54:

| | Gr. |
|---|---|
| Paste 11–W61 (Penn. Color & Chem.—TiO$_2$ and 30% D.O.P.) | 367.5 |
| Polymer Lab. Polymer 119–249 | 241.4 |
| SF69 (Silicone Fluid General Electric) | 1.2 |
| Du Pont Lacquer Thinner #3656 | 703.5 |

Paint weighing 8.8#/gal., 47 sec. #4 Ford Cup at 24° C. was obtained.

Paste 11–W61 is a paste containing 70% of titanium dioxide white pigment and 30% of dioctyl phthalate as the liquid ingredient thereof.

SF69 is a polysilicone liquid used as recommended by the manufacturer as an anti-forming agent.

Polymer 119–249 is a copolymer of 92% methyl methacrylate, 4% ethyl methacrylate and 4% of methacrylic acid, molecular weight as determined by viscosity measurement of 60,000.

Du Pont Lacquer Thinner #3656 is a blend of a major amount of aromatic hydrocarbons and a minor amount of aliphatic ketones, e.g., xylol and methyl ethyl ketone, containing small amounts of esters such as ethyl acetate.

The foregoing paint formulation was modified by the addition of dimethacrylate cross-linking agents containing stabilizers as indicated in Table V below, the cross-linking agents being added to the paint batch, the paint being sprayed and air dried for ½ hour to bonderized panels and thereafter baked at 300° F. for 30 minutes. All of the panels showed high gloss.

TABLE V

| Composition | Sward Hardness | Mandrel Bend, inches | Oily Film |
|---|---|---|---|
| (1) Control | 30 | 3/16 | no. |
| (2) 10% triethylene glycol dimethacrylate (60 p.p.m. hydroquinone) | 18 | 1/8 | yes. |
| (3) 10% triethylene glycol dimethacrylate (containing 10% of allyl epoxy stearate) | 18 | 1/8 | yes. |
| (4) 10% triethylene glycol dimethacrylate (500 p.p.m. N,N-dimethyl cyclohexylamine) | 33 | 1/8 | no. |
| (5) 10% triethylene glycol dimethacrylate (containing 10% allyl glyceryl phthalate) | 20 | 1/8 | yes. |
| (6) 10% triethylene glycol dimethacrylate (containing 10% diallyl sebacate) | 21 | 1/8 | yes. |

In the foregoing table it is shown that the control batch formulated in accordance with the above formula for paint lab. batch #54 and to which no cross-linking dimethacrylate ester was added exhibited a Sward hardness of 30 and a mandrel bend rating of 3/16". The mandrel bend rating in the present example and in the foregoing example is an indication of the flexibility of the film when the base is bent back upon itself and indicates the width below which the film of the panel cracks at the bend.

The mandrel bend value 3/16" for the control provides indication of the lessor degree of flexibility than samples 2, 3, 4, 5 and 6 in Table V hereinabove.

Upon addition of hydroquinone stabilizer, the Sward hardness value drops to a rating of 18. A similar rating is obtained by employing an epoxy stabilizer, allyl epoxy stearate as shown in composition 3 of Table V above. In contrast, the composition of the invention, composition 4 employing 500 parts per million of N,N-dimethyl cyclohexylamine provides a Sward hardness rating of 33 and there is no oily characteristic of the film. Compositions No. 5 and No. 6 of Table V above illustrate the use of other hardening agents, allyl glyceryl phthalate and diallyl sebacate, respectively. In both cases the Sward hardness value is substantially the same as the case of hydroquinone. The data thereby demonstrates the superiority for hardening of the dimethyl cyclohexylamine as a catalyst for the curing of the film.

A further run was made with paint lab. batch #56 having the composition as shown hereinbelow:

(2) Paint lab. batch #56:

| | | |
|---|---|---|
| Paste 11–W61 | gr | 95.6 |
| Polymer lab. batch 131–25 | gr | 62.8 |
| SF69 | drops | 30 |
| Dupont lacquer thinner #3656 | | 183.0 |

Paint weights 8.8"/gal., 22 sec. in #4 Ford Cup at 24° C.

Lab polymer 131–25 is a copolymer of

| Methyl methacrylate | percent | 97.0 |
|---|---|---|
| Methacrylic acid | do | 3.0 |

Viscosity molecular weight as calculated as methyl methacrylate polymer=50,000.

With paint batch #56, an additive was tried using the same procedure as described above. The results are as follows:

TABLE VI

| Composition | Sward Hardness | Mandrel Bend |
|---|---|---|
| (1) Control | 29 | 5/6". |
| (2) Add 10% triethylene glycol dimethacrylate (500 p.p.m. N,N-dimethyl cyclohexylamine, 350° F., 3 hrs.[1] | 39 | poor 1". |

[1] Plasticizer was probably vaporized.

In the foregoing data shown in Table VI the control constitutes the composition shown hereinabove for paint batch #56. By adding 500 parts per million of N,N-dimethyl cyclohexylamine to the triethylene glycol dimethacrylate monomer hardening agent and by heating for 3 hours at 350° F. the Sward hardness value increased to a rating of 39.

The foregoing table thus illustrates the improved hardening which can be expected at elevated temperatures for longer periods of time.

EXAMPLE VII

The following example illustrates the utilization of N,N-dimethyl cyclohexylamine in a polyester formulation, the polyester formulation containing a soluble alkyd in one embodiment and a soluble polyester in another embodiment together with methyl methacrylate monomer as the polymerizable plasticizing hardening agent for the casting composition.

The first embodiment of polyester employed is available commercially as Paraplex P-444 which contains methyl methacrylate and styrene monomer and diethylene glycol maleate polyester, the polyester-monomer mixture having a viscosity of between 2860–3560 centipoises and a Gardner-Holdt viscosity of Z–Z$_1$, the polyester concentration being 74–76%, the APHA color rating being 100 max. and the acid number (mg. KOH per gm. resin) being 38 max., the specific gravity being 1.50 and the methyl methacrylate monomer constituting 24–26% of the composition.

Similar results were obtained with a modified composition of Paraplex P–444 containing 75% resin, 15% of methyl methacrylate monomer and 5% of styrene monomer having a viscosity of Y to Z on the Gardner-Holdt scale, an acid number of 30 max.

A casting was made first using hydroquinone 80 p.p.m. as inhibitor and using 0.5% of each of the following peroxides benzoyl peroxide, lauroyl peroxide and methyl ethyl ketone peroxide. The castings were cured at 175° F. bath temperature for one-half hour after the exotherm peak had been observed. The time for the peak is about 5–8 minutes.

The same casting was prepared omitting hydroquinone as the inhibitor and substituting therefor dimethyl cyclohexylamine in a concentration of 600 p.p.m. In a first run 0.3% of benzoyl peroxide was used and the cure carried out at 175° F. and post cured at 220° F. for two hours as with the hydroquinone control. In this case, there was no induction period noted and improved color, higher light transmission and better ageing stability were noted for this product of the invention.

A similar beneficial result was obtained with the polyester containing 5% of styrene as in the composition pointed out above using a bath temperature of 175° F. and post cured at 220° F. for two hours.

The foregoing runs were repeated with dimethyl cyclohexylamine but leaving out the peroxide and carrying out the cure at 195° F. for one hour. In this case, products having slightly better surface hardness properties and otherwise equivalent properties were obtained.

By substituting neutral diethylene glycol phthalate for 50% of the polyester component of P–444 above similar beneficial results were obtained.

EXAMPLE VIII

The folllowing example illustrates the utilization of N,N-dimethylcyclohexylamine in a slurry molding composition comprising a monomeric constituent containing as a poymerization regulator 0.075% by weight of the monomeric constituent N,N-dimethyl cyclohexylamine and a polymer which is generally in the form of discrete spheres of average particle size of 100–200 mesh Tyler screen.

The first embodiment of slurry molding employed is commercially available polymethyl methacrylate, for example, Type 5 (produced by Sartomer Resins, Inc.) in the proportion by weight of 2 parts, and one part of a methyl methacrylate or a methyl methacrylate to which 10% of a cross-linking agent such as ethylene dimethacrylate has been added. The ingredients are spatulated together and allowed to stand at room temperature for 15 minutes until a dough consistency is obtained. This dough can then be compression molded in a plaster or metal mold and polymerized at 158° F. for one hour and 212° F. for an additional one-half hour. Under these conditions a satisfactory molding can generally be produced. However, it is desirable to have less critical temperature conditions and with the formulation a wide range in temperature of processing produces a molded object free from porosity and of high density. A similar molding not utilizing N,N-dimethyl cyclohexylamine but utilizing an inhibitor such as 60 p.p.m. hydroquinone will often show porosity presumed to be caused by excessive rate of polymerization which excessively raises the internal temperature in all but the smallest molds. A much wider range of molding temperature can be achieved using the N,N-dimethyl cyclohexylamine, in fact, the molding may be processed at 212° F. for one-half hour with little porosity.

EXAMPLE IX

The following example illustrates the use of N,N-dimethyl cyclohexylamine in a cast composition comprising methyl methacrylate monomer containing 4.5% by weight of triethylene glycol dimethacrylate and containing as a polymerization regulator N,N-dimethyl cyclohexyl amine to the extent of 0.05% by weight and as catalyst, diacetyl peroxide in amount of 0.25% by weight of the monomers. This monomer composition is poured between plate glass sheets which are separated by a butyl rubber gasket and clamped with book binder clamps. The gasket is sealed and the casting is heated at 85–90° C. for 16 hours and then fast cured at 105° C. for one hour. The sheet was removed to give a clear casting without blemishes such as bubbles, lakes or haze. A similar sheet cured without the regulator showed imperfections in the form of lakes and bubbles.

In the foregoing examples the utilization of the heat-sensitive regulator-inhibitor for acrylic monomers has been illustrated in the absence of organic peroxide polymerization catalyst and in the presence of organic peroxide polymerization catalyst.

Peroxides which are suitable for use include

[Low temperature: 20–60° C.]

t-Butyl hydroperoxide
Cumene hydroperoxide
p-Methane hydroperoxide
Diisopropylbenzene hydroperoxide
Cyclohexanone peroxide
Methyl ethyl ketone peroxide
Methyl isobutyl ketone peroxide
Acetyl peroxide
Hydroxyheptyl peroxide
2,4-dichlorobenzoyl peroxide

[Medium temperature: 60–120° C.]

Benzoyl peroxide
Naphthoyl peroxide
Methyl amyl ketone peroxide
Methyl ethyl ketone peroxide
Lauroyl peroxide
2,2-bis-t-butyl peroxybutane

[High temperature: 120–150° C.]

Dibenzal diperoxide         Di-t-butyl peroxide
t-Butyl perbenzoate         Di-t-butyl perphthalate The level of peroxide which is preferred as a minimum is about 0.02% in combination with the regulator-inhibitor. An optimum level is between 0.2 to 0.4% of peroxide as identified above. Below the minimum amount listed above the desired advantage of accelerated polymerization is not practicably achieved. Above the maximum level of 0.8% peroxide of the monomer, there is a tendency to introduce porosity.

In the foregoing, the regulator-inhibitor of the invention has been exemplified by dimethyl cyclohexylamine but homologues are fully equivalent in the same proportions as are also hydroxyl, alkyl, monohalogen alkyl and alkoxy alkyl N substituted cyclohexylamines, e.g., diethyl cyclohexylamine, dibutylcyclohexylamine, methyl ethyl cyclohexylamine, di (alpha chloro ethyl) cyclohexylamine, di (ethoxy ethyl) cyclohexylamine, di (ethanol) cyclohexylamine, etc.

In contrast to the inactivation of inhibition and regulating action exhibited by these regulator-inhibitors of the invention other inhibitors besides hydroquinone and dimethyl ether of hydroquinone have been compared and found to behave in a different physical and chemical manner than the regulator-inhibitors of the invention. Allyl compounds as cross-linkers are known to exhibit an inhibiting and regulating action and typically allyl compounds which were tried were diallyl sebacate and alpha allyl glycerol diphthalate. Neither of these allyl compounds in the same range of proportions provided enhanced surface hardness, the polymerization did not go to the extent as with the compounds of the invention and bubble formation was noted in contrast to absence of bubbles and enhanced extent of polymerization with compounds of the invention. Likewise, allyl epoxy compounds, e.g., allyl 9,10-epoxy stearate, showed undesirable porosity after polymerization and insufficient cross-linking.

The invention is defined in the claims which follow.

I claim:

1. In a method of polymerizing a composition comprising a liquid polymerizable methacrylate ester monomer having a boiling point of at least about 100° C. at temperatures of above about 100° C. in the presence of a polymer selected from the group consisting of methyl methacrylate polymer, vinyl chloride polymer, cellulose nitrate and glyceryl phthalate resin, the step of adding to said monomer from about 200 to about 2000 parts by weight per million parts of said monomer of a heat sensitive inhibitor compound of the formula

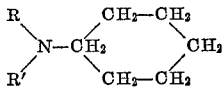

wherein R and R' are each a member selected from the group consisting of methyl, ethyl and hydroxyethyl and heating the mixture at a temperature above about 100° C. whereby said liquid monomer is polymerized by the accelerating action of said compound as sole accelerator at said temperature above about 100° C., said compound inhibiting polymerization of said monomer at temperature below about 100° C.

2. A method as claimed in claim 1 wherein said composition is an acrylic casting composition containing methyl methacrylate monomer and methyl methacrylate polymer.

3. A method as claimed in claim 1 wherein said composition is a coating composition containing methyl methacrylate polymer and said polymerizable monomer is a polyfunctional methacrylate ester cross-linking agent.

4. A method as claimed in claim 1 wherein said polymerizable monomer is methyl methacrylate.

5. A method as claimed in claim 1 wherein said polymerizable monomer is constituted by a mixture of methacrylic acid diesters having an average molecular weight in the range of 100 to 300 and said diesters prepared from 2 mols of methacrylic acid and one mol of a lower dihydric alcohol characterized by the formula $$HO(CH_2-CH_2-O)_nH$$

where $n$ is an integer from 1 to 20.

6. A method as claimed in claim 1 wherein said compound is N,N-dimethyl cyclohexylamine.

References Cited in the file of this patent

UNITED STATES PATENTS

| | | |
|---|---|---|
| 2,558,139 | Knock et al. | June 26, 1951 |
| 2,833,753 | Lal | May 6, 1958 |
| 2,861,060 | Goode | Nov. 18, 1958 |

FOREIGN PATENTS

| | | |
|---|---|---|
| 738,628 | Great Britain | Oct. 19, 1955 |